United States Patent
Wada

(10) Patent No.: US 10,695,858 B2
(45) Date of Patent: Jun. 30, 2020

(54) WELDING TORCH AND MOUNTING JIG THEREOF

(71) Applicant: TAIYO NIPPON SANSO CORPORATION, Tokyo (JP)

(72) Inventor: Katsunori Wada, Kai (JP)

(73) Assignee: TAIYO NIPPON SANSO CORPORATION, Tokyo (JP)

(*) Notice: Subject to any disclaimer, the term of this patent is extended or adjusted under 35 U.S.C. 154(b) by 644 days.

(21) Appl. No.: 15/305,158

(22) PCT Filed: Apr. 22, 2015

(86) PCT No.: PCT/JP2015/062185
§ 371 (c)(1),
(2) Date: Oct. 19, 2016

(87) PCT Pub. No.: WO2015/163346
PCT Pub. Date: Oct. 29, 2015

(65) Prior Publication Data
US 2017/0043425 A1 Feb. 16, 2017

(30) Foreign Application Priority Data

Apr. 22, 2014 (JP) ................. 2014-088475

(51) Int. Cl.
*B23K 9/28* (2006.01)
*B23K 9/167* (2006.01)
(Continued)

(52) U.S. Cl.
CPC .............. *B23K 9/28* (2013.01); *B23K 9/12* (2013.01); *B23K 9/126* (2013.01); *B23K 9/167* (2013.01); *B23K 9/287* (2013.01); *B23K 9/296* (2013.01)

(58) Field of Classification Search
CPC . B23K 9/28; B23K 9/12; B23K 9/126; B23K 9/167; B23K 9/287; B23K 9/296
(Continued)

(56) References Cited

U.S. PATENT DOCUMENTS

| | | | | | |
|---|---|---|---|---|---|
| 2,710,902 | A | * | 6/1955 | Pilia .................. | B23K 9/167 219/74 |
| 3,440,393 | A | * | 4/1969 | Hasson ............... | B23K 9/0288 219/60 R |
| 3,469,069 | A | * | 9/1969 | Allen .................. | B23K 9/007 219/127 |

(Continued)

FOREIGN PATENT DOCUMENTS

| | | |
|---|---|---|
| EP | 2 008 750 | 12/2008 |
| FR | 2 746 687 | 10/1997 |

(Continued)

OTHER PUBLICATIONS

International Search Report for PCT/JP2015/062185 dated Jul. 28, 2015, 1 page.

(Continued)

*Primary Examiner* — Chee-Chong Lee
(74) *Attorney, Agent, or Firm* — Nixon & Vanderhye P.C.

(57) ABSTRACT

The present invention relates to a welding torch including a mounting jig for mounting a wire-aiming guide which feeds a welding wire toward a molten pool of a work piece, wherein the mounting jig has a male screw that can be screwed into a female screw provided in a torch body, and is detachably mounted to the torch body; and a mounting jig. The present invention provides the welding torch with which a wire-aiming guide can be stably mounted and which can mount a highly versatile wire-aiming guide; and the mounting jig.

7 Claims, 13 Drawing Sheets

(51) Int. Cl.
*B23K 9/29* (2006.01)
*B23K 9/12* (2006.01)

(58) Field of Classification Search
USPC .......................................................... 219/75
See application file for complete search history.

(56) References Cited

U.S. PATENT DOCUMENTS

| | | | | |
|---|---|---|---|---|
| 4,136,273 | A * | 1/1979 | Eujita | B23K 9/1675 219/121.36 |
| 5,789,717 | A * | 8/1998 | Imaizumi | B23K 9/167 219/136 |
| 2013/0193117 | A1 | 8/2013 | Wada et al. | |
| 2014/0374400 | A1 | 12/2014 | Gerda | |

FOREIGN PATENT DOCUMENTS

| | | |
|---|---|---|
| JP | 2-118670 | 9/1990 |
| JP | 2001-287037 | 10/2001 |
| JP | 2004-141915 | 5/2004 |
| JP | 2015-205332 | 11/2015 |
| WO | WO 2012/111695 | 8/2012 |
| WO | WO 2013/145430 | 10/2013 |

OTHER PUBLICATIONS

Japanese Notice of Allowance issued in App. No. 2016-514961 dated May 23, 2017 (w/ translation).

Office Action issued in IN Appln. No. 201617035881 dated Aug. 26, 2019.

* cited by examiner (B)　　　　　(A)　　　　　(C)

WELDING TORCH AND MOUNTING JIG THEREOF

TECHNICAL FIELD

The present invention relates to a welding torch and a mounting jig thereof.

This application is the U.S. national phase of International Application No. PCT/JP2015/062185 filed Apr. 22, 2015 which designated the U.S. and claims priority to Japanese Patent Application No. 2014-088475, filed Apr. 22, 2014, the entire contents of which are incorporated herein by reference.

BACKGROUND ART

When a structure (work piece) including metal or non-ferrous metal as a welding base material is welded, non-consumable electrode type gas shield arc welding, so-called gas tungsten arc welding (GTAW), such as tungsten inert gas welding (TIG welding), has been conventionally used.

In TIG welding, a TIG welding torch is generally used, welding is performed by generating an arc between a non-consumable electrode and a work piece, melting the work piece by heat of the arc, and forming a molten pool. In addition, welding is performed by emitting a shield gas from a torch nozzle surrounding the non-consumable electrode, and thereby blocking atmosphere (air) by the shield gas.

Below, one example of a TIG welding torch which has been generally used is explained referring to FIGS. 14A and 14B. Moreover, FIG. 14A is a side view of the TIG welding torch 100, and FIG. 14B is a cross section of a main section of the TIG welding torch shown in FIG. 14A.

As shown in FIGS. 14A and 14B, the TIG welding torch 100 mainly includes a non-consumable electrode 101 which generates an arc between the non-consumable electrode 101 and a work piece; a collet 102 which supports the non-consumable electrode 100 in a state where the non-consumable electrode 100 is inserted into the collet 102; a collet body 103 on the inside of which the collet 102 is held in a state of projecting the non-consumable electrode 101 from the front end side; a torch body 104 on which the collet body 103 is mounted; a torch nozzle 105 which is mounted on the collet body 103 in a state of surrounding the non-consumable electrode 101, and emits a shield gas toward a molten pool of a work piece generated by the arc; a front side gasket 106 which is disposed between the torch body 104 and the torch nozzle 105; a torch cap 108 which is mounted in a state of disposing a rear side gasket 107 between the torch body 104 and the torch cap 108; and a handle 109 on which the torch body 104 is mounted and which a user holds.

When the TIG welding torch 100 explained above is used, welding is performed by connecting a welding cable C, emitting a shield gas, which is supplied from the welding cable C, from the torch nozzle 105 while generating an arc between the non-consumable electrode 101 and the work piece by electric power supplied from the welding cable C.

PRIOR ART DOCUMENT

Patent Document

Patent Document No. 1: PCT International Publication No. WO 2013/145430

DISCLOSURE OF THE INVENTION

Problems to be Solved

However, in the TIG welding explained above, welding is performed by using the TIG welding torch 100 while feeding a filler metal (welding rod) by hand. In this case, a user has to supply the filler metal and operate the TIG welding torch at the same time by both hands. Therefore, a skillful technique is required.

It is also possible to TIG weld semi-automatically by mounting a wire-aiming guide (also called a filler guide) on the TIG welding torch 100 and thereby automatically feeding a welding wire (also called a filler) which is the filler metal. In this case, the welding wire is easily supplied, but the operability of the TIG welding torch 100 may be worsen by the wire-aiming guide mounted to the TIG welding torch 100.

Specifically, since the wire-aiming guide is mounted near the outer periphery of the torch nozzle 105 with a mounting jig, the wire-aiming guide is easily affected by heat of an arc. In addition, a problem that the wire-aiming guide moves during the operation, and a feeding position of the welding wire is not determined arises. Furthermore, the mounting jig has low universal use, and there is a problem that the mounting jig is not shared between the TIG welding torches which are made by different manufacturers.

In consideration of the above-described problems, it is an object of the present invention to provide a welding torch to which the wire-aiming guide can be mounted in stable conditions, and the wire-aiming guide having high universal use can also be mounted, and a mounting jig.

Means for Solving the Problem

In order to solve the problems, the present invention provides the following welding torches and mounting jigs.
(1) A welding torch including:
a non-consumable electrode which generates an arc between a work piece and the non-consumable electrode;
a collet which supports the non-consumable electrode in a state where the non-consumable electrode is inserted;
a collet body on the inside of which the collet is held in a state of projecting the non-consumable electrode from a front end of the collet body;
a torch body on which the collet body is mounted and which includes an electric supplying part for supplying electric power to the non-consumable electrode through the collet body and the collet and a passage for supplying a shield gas;
a torch nozzle which is mounted on the collet body in a state of surrounding the non-consumable electrode and emits the shield gas toward a molten pool of the work piece which is generated by the arc;
a torch cap which has a male screw which can be screwed into a female screw of the torch body which is formed on the side opposite to the side where the collet body is mounted and is detachably mounted on the torch body; and
a mounting jig with which a wire-aiming guide which feeds a welding wire toward the molten pool of the work piece is mounted;
wherein the mounting jig includes a male screw which can be screwed into the female screw of the torch body and is detachably mounted on the torch body.
(2) The welding torch according to (1), wherein the mounting jig includes a female screw into which the male screw of the torch cap can be screwed, and the torch cap is detachably mounted on the mounting jig by screwing the male screw of the torch cap into the female screw of the mounting jig.

(3) The welding torch according to (1) or (2), wherein the mounting jig includes a through hole in which the non-consumable electrode is penetrated.

(4) The welding torch according to any one of (1) to (3), wherein, in a state where the male screw of the mounting jig is screwed into the female screw of the torch body, a front end of the male screw pressurizes the collet toward a front end side while the front end of the male screw is in contact with a rear end of the collet.

(5) The welding torch according to (3), wherein the mounting jig includes an extension collet which slidably supports the non-consumable electrode inserted into the through hole in the longitudinal direction;

in a state where the male screw of the mounting jig is screwed into the female screw of the torch body, and the male screw of the torch cap is screwed into the female screw of the mounting jig, the front end of the extension collet pressurizes the collet toward a front end side while the front end of the extension collet is in contact with the rear end of the collet.

(6) The welding torch according to any one of (1) to (5), wherein the wire-aiming guide is mounted on a periphery of the mounting jig through a support tool.

(7) The welding torch according to (6), wherein a feeding position of the welding wire is adjusted by changing a mounting position of the support tool relative to the mounting jig.

(8) The welding torch according to (7), wherein the mounting jig includes a stopper which regulates a movement of the support tool.

(9) A mounting jig with which a wire-aiming guide for supplying a welding wire toward a molten pool of a work piece is mounted on a welding torch including: a non-consumable electrode which generates an arc between a work piece and the non-consumable electrode; a collet which supports the non-consumable electrode in a state where the non-consumable electrode is inserted; a collet body on the inside of which the collet is held in a state of projecting the non-consumable electrode from a front end of the collet body; a torch body on which the collet body is mounted and which includes an electric supplying part for supplying electric power to the non-consumable electrode through the collet body and the collet and a passage for supplying a shield gas; a torch nozzle which is mounted on the collet body in a state of surrounding the non-consumable electrode, and emits the shield gas toward a molten pool of the work piece which is generated by the arc; and a torch cap which has a male screw which can be screwed into a female screw of the torch body which is formed on the side opposite to the side where the collet body is mounted, and is detachably mounted on the torch body;

wherein the mounting jig includes a male screw which can be screwed into the female screw of the torch body, is detachably mounted on the torch body.

(10) The mounting jig according to (9), wherein the mounting jig includes a female screw into which the male screw of the torch cap can be screwed, and the torch cap is detachably mounted on the mounting jig by screwing the male screw of the torch cap into the female screw of the mounting jig.

(11) The mounting jig according to (9) or (10), wherein the mounting jig includes a through hole in which the non-consumable electrode is penetrated.

(12) The mounting jig according to any one of (9) to (11), wherein, in a state where the male screw of the torch cap is screwed into the female screw of the torch body, a front end of the male screw pressurizes the collet toward a front end side while the front end of the male screw is in contact with a rear end of the collet.

(13) The mounting jig according to (11), wherein the mounting jig includes an extension collet which slidably supports the non-consumable electrode inserted into the through hole in the longitudinal direction;

in a state where the male screw of the mounting jig is screwed into the female screw of the torch body, and the male screw of the torch cap is screwed into the female screw of the mounting jig, the front end of the extension collet pressurizes the collet toward a front end side while the front end of the extension collet is in contact with the rear end of the collet.

(14) The mounting jig according to any one of (9) to (13), wherein the wire-aiming guide is mounted on a periphery of the mounting jig through a support tool.

(15) The mounting jig according to (14), wherein a mounting position of the support tool is changeable.

(16) The mounting jig according to (15), wherein the mounting jig includes a stopper which regulates a movement of the support tool.

In other words, the present invention has the following embodiments.

[1] A welding torch including:

a non-consumable electrode which generates an arc between a work piece and the non-consumable electrode;

a collet which supports the non-consumable electrode in a state where the non-consumable electrode is inserted;

a collet body on the inside of which the collet is held in a state of projecting the non-consumable electrode from a front end of the collet body;

a torch body on which the collet body is mounted, and which includes an electric supplying part for supplying electric power to the non-consumable electrode through the collet body and the collet and a passage for supplying a shield gas;

a torch nozzle which is mounted on the collet body in a state of surrounding the non-consumable electrode and emits the shield gas toward a molten pool of the work piece which is generated by the arc;

a torch cap which has a male screw which can be screwed into a female screw of the torch body which is formed on the side opposite to the side where the collet body is mounted and is detachably mounted on the torch body;

a wire-aiming guide which feeds a welding wire toward the molten pool of the work piece; and a mounting jig with which the wire-aiming guide is mounted;

wherein the mounting jig includes a male screw which can be screwed into the female screw of the torch body, and is detachably mounted on the torch body.

[2] The welding torch according to [1], wherein the mounting jig includes a female screw into which the male screw of the torch cap can be screwed, and the torch cap is detachably mounted on the mounting jig by screwing the male screw of the torch cap into the female screw of the mounting jig.

[3] The welding torch according to [1] or [2], wherein the mounting jig includes a through hole in which the non-consumable electrode is penetrated.

[4] The welding torch according to any one of [1] to [3], wherein, in a state where the male screw of the mounting jig is screwed into the female screw of the torch body, a front end of the male screw pressurizes the collet toward a front end side of the collet body while the front end of the male screw is in contact with a rear end of the collet.

[5] The welding torch according to [3], wherein the mounting jig includes an extension collet which slidably supports the non-consumable electrode inserted into the through hole in the longitudinal direction;

in a state where the male screw of the mounting jig is screwed into the female screw of the torch body, and the male screw of the torch cap is screwed into the female screw of the mounting jig, the front end of the extension collet pressurizes the collet toward a front end side of the collet body while the front end of the extension collet is in contact with the rear end of the collet.

[6] The welding torch according to any one of [1] to [5], wherein the wire-aiming guide is mounted on a periphery of the mounting jig through a support tool.

[7] The welding torch according to [6], wherein a feeding position of the welding wire is adjusted by changing a mounting position of the support tool relative to the mounting jig.

[8] The welding torch according to [7], wherein the mounting jig includes a stopper which regulates a movement of the support tool.

[9] A mounting jig with which a wire-aiming guide for feeding a welding wire toward a molten pool of a work piece is mounted on a welding torch including: a non-consumable electrode which generates an arc between a work piece and the non-consumable electrode; a collet which supports the non-consumable electrode in a state where the non-consumable electrode is inserted; a collet body on the inside of which the collet is held in a state of projecting the non-consumable electrode from a front end of the collet body; a torch body on which the collet body is mounted and which includes an electric supplying part for supplying electric power to the non-consumable electrode through the collet body and the collet and a passage for supplying a shield gas; a torch nozzle which is mounted on the collet body in a state of surrounding the non-consumable electrode which protrudes from the collet and emits the shield gas toward a molten pool of the work piece which is generated by the arc; and a torch cap which has a male screw which can be screwed into a female screw of the torch body which is formed on the side opposite to the side where the collet body is mounted and is detachably mounted on the torch body;

wherein the mounting jig includes a male screw which can be screwed into the female screw of the torch body, is detachably mounted on the torch body.

[10] The mounting jig according to [9], wherein the mounting jig includes a female screw into which the male screw of the torch cap can be screwed, and the torch cap is detachably mounted on the mounting jig by screwing the male screw of the torch cap into the female screw of the mounting jig.

[11] The mounting jig according to [9] or [10], wherein the mounting jig includes a through hole in which the non-consumable electrode is penetrated.

[12] The mounting jig according to any one of [9] to [11], wherein, in a state where the male screw of the torch cap is screwed into the female screw of the torch body, a front end of the male screw pressurizes the collet toward a front end side while the front end of the male screw is in contact with a rear end of the collet.

[13] The mounting jig according to [11], wherein the mounting jig includes an extension collet which slidably supports the non-consumable electrode inserted into the through hole in the longitudinal direction;

in a state where the male screw of the mounting jig is screwed into the female screw of the torch body, and the male screw of the torch cap is screwed into the female screw of the mounting jig, the front end of the extension collet pressurizes the collet toward a front end side while the front end of the extension collet is in contact with the rear end of the collet.

[14] The mounting jig according to any one of [9] to [13], wherein the mounting jig includes a support tool for mounting the wire-aiming guide mounted on a periphery of the mounting jig.

[15] The mounting jig according to [14], wherein a mounting position of the support tool is changeable.

[16] The mounting jig according to [15], wherein the mounting jig includes a stopper which regulates a movement of the support tool.

[17] The mounting jig according to [15] or [16], wherein the support tool includes a ring part having an open part, and an arm part which outwardly extends from the periphery of the ring part, the ring part has a pair of flange portions at both ends of the open part, and the support tool can be detached from the mounting jig by the flange portions.

[18] The mounting jig according to [17], wherein the arm part has an open par for fixing a feeding head of the wire-aiming guide.

Effects of the Present Invention

As explained above, according to the present invention, it is possible to provide a welding torch on which a wire-aiming guide can be mounted in stable conditions and on which a wire-aiming guide having high universal use is mounted, and a mounting jig.

DESCRIPTION OF EMBODIMENTS

Below, embodiments of the welding torch and the mounting jig according to the present invention are explained in detail referring to figures.

First Embodiment

Figure 1:
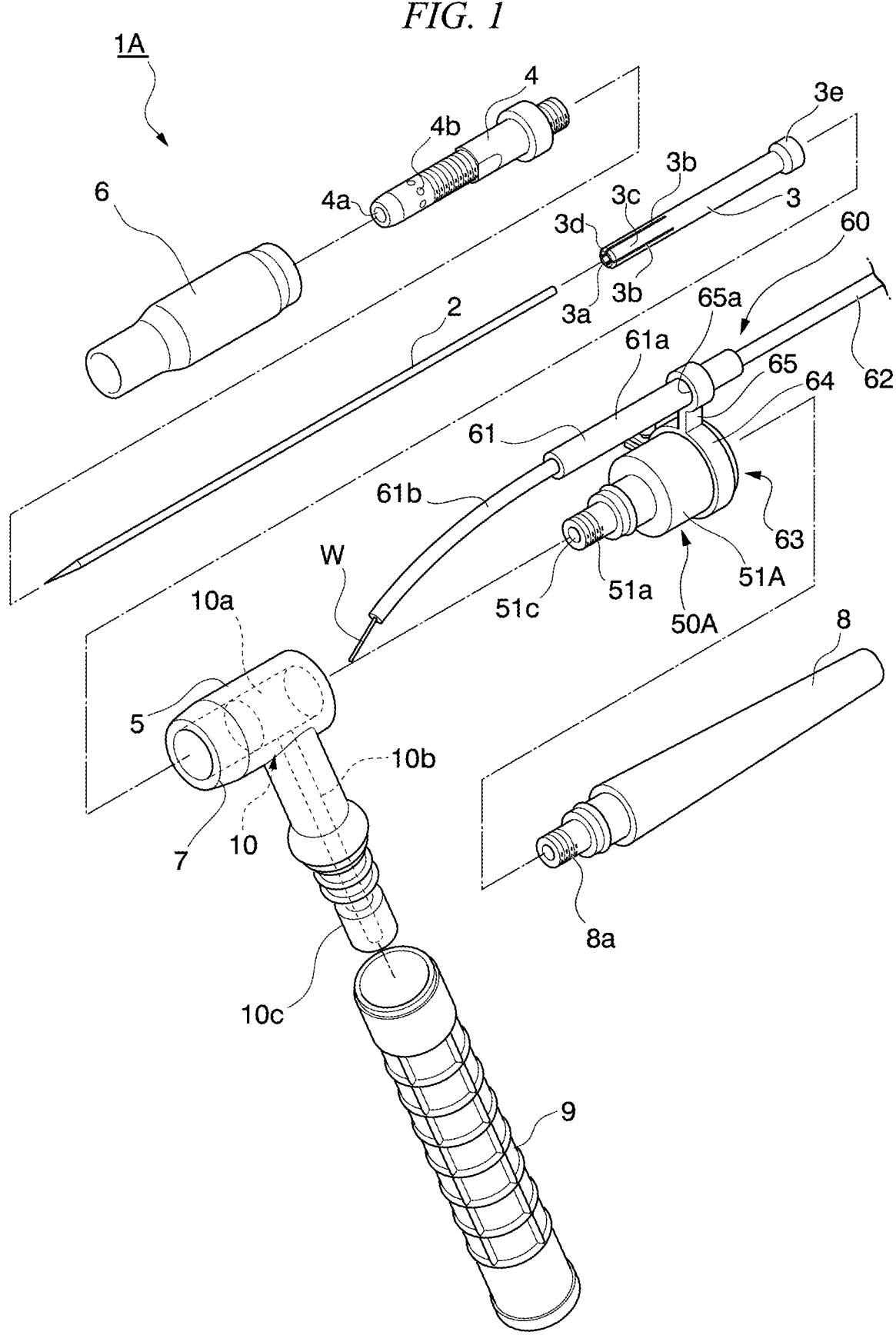
FIG. 1 is an exploded perspective view illustrating a welding torch and a mounting jig according to the first embodiment of the present invention.
Figure 2:
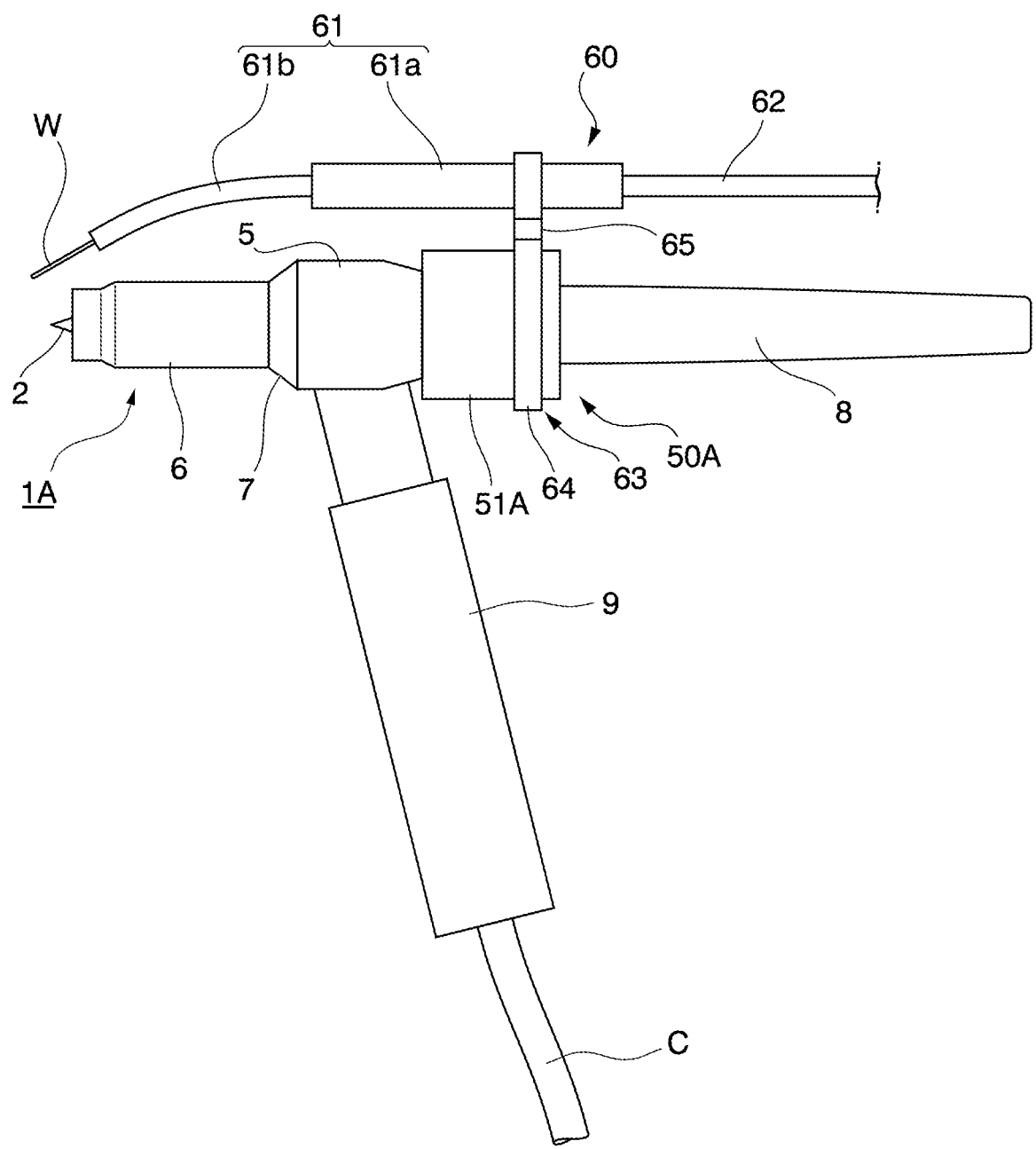
FIG. 2 is a side view illustrating the welding torch shown in FIG. 1.
Figure 3:
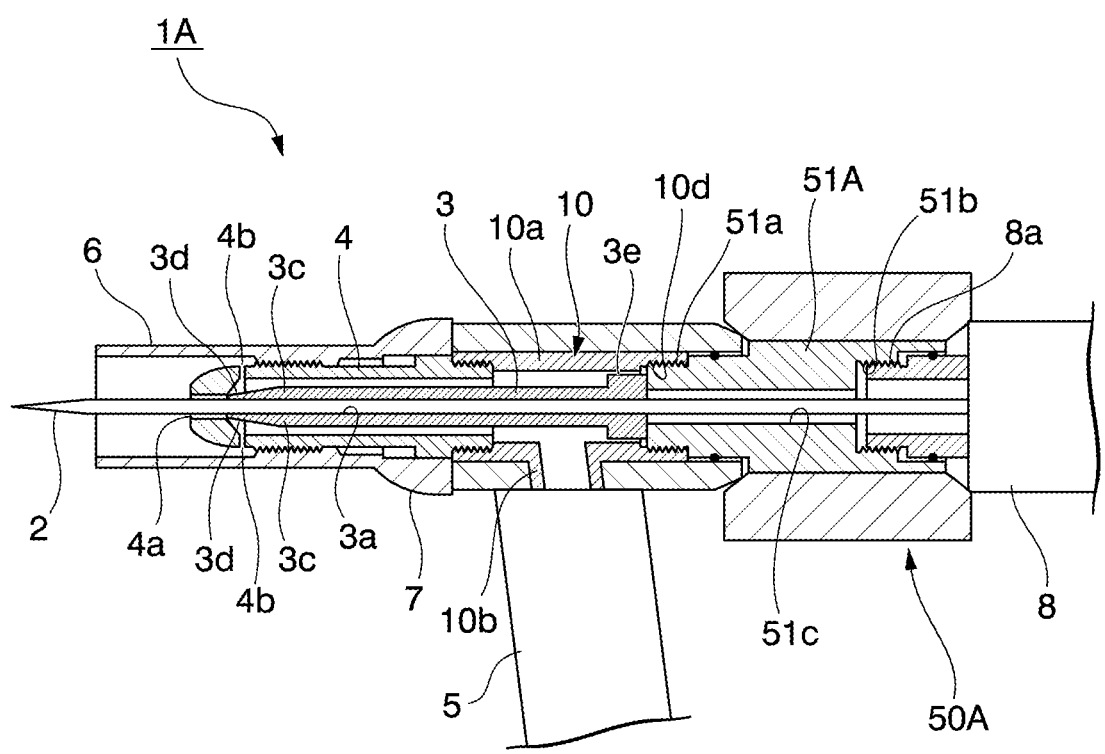
FIG. 3 is a cross section illustrating a mounting mechanism of the mounting jig mounted on the welding torch shown in FIG. 1.

First, as a first embodiment of the present invention, a welding torch 1A and a mounting jig 50A shown in FIGS. 1 to 3 are explained. Moreover, FIG. 1 is an exploded perspective view illustrating a welding torch 1A. FIG. 2 is a side view illustrating the welding torch 1A shown in FIG. 1. FIG. 3 is a cross section illustrating a mounting mechanism of the mounting jig 50A mounted on the welding torch 1A shown in FIG. 1.

As shown in FIGS. 1 to 3, the welding torch 1A mainly includes a non-consumable electrode 2 which generates an arc between a work piece and the non-consumable electrode 2; a collet 3 which supports the non-consumable electrode 2 in a state where the non-consumable electrode is inserted inside thereof; a collet body 4 on the inside of which at least one portion of the collet 3 protruding the non-consumable electrode protrudes from the front end side is held; a torch body 5 on which the collet body 4 is mounted in a state where at least one portion of the collet 3 is held inside thereof; a torch nozzle 6 which is mounted on the collet body 4, covers the periphery of the non-consumable electrode 2 protruding from the collet body 4, and emits a shield gas toward a molten pool of the work piece which is generated by the arc; a front side gasket 7 which is arranged between the torch body 5 and the torch nozzle 6; a torch cap 8 which is mounted on the torch body 5 through the mounting jig 50A; and a handle 9 on which the torch body is mounted 5, and a user holds.

In other words, the welding torch 1A of the first embodiment has a structure in which a wore-aiming guide 60 which feeds a welding wire W toward a molten pool of a work piece explained below is mounted on the generic TIG welding torch 100 with the mounting jig 50A.

The non-consumable electrode 2 is a long electrode bar formed using a metallic material having a high melting point, for example, tungsten.

The collet 3 is a roughly cylindrical member formed using metallic material having excellent electric conductivity and heat conductivity, for example, copper or a copper alloy. The collet has a through hole 3a which is penetrated in the longitudinal direction, and supports the non-consumable electrode 2 which is inserted on the inside of the through hole 3a as it can slide in the longitudinal direction. In addition, multiple slits 3b are provided side by side in a circumferential direction at front end side of the collet 3. The multiple slits 3b are formed by linearly cut out the collet 3 from the front end to midway in the longitudinal direction thereof. Thereby, the front end portions 3c between slits 3b of the collet 3 can elastically deform in the shrunk radial direction. On the other hand, the rear end side of the collet 3 has an enlarged diameter portion 3e. The enlarged diameter portion 3e is in contact with the mounting bracket 51A which is explained below.

The collet body 4 is a roughly cylindrical member formed using metallic material having excellent electric conductivity and heat conductivity, for example, copper or a copper alloy. The collet body 4 has a through hole 4a which penetrates in the longitudinal direction. The collet body 4 holds the collet 3 which is inserted into the through hole 4a from the rear end side. In addition, the through hole 4a of the collet body 4 is also a passage in which a shield gas supplied from the torch body 5 side flows. In addition, the radius of the front end of the collet body 4 is gradually reduced along with the through hole 4a, and only the non-consumable electrode 2 protrudes from the front end of the through hole 4a. Furthermore, there are multiple ejection holes 4b from which the shield gas is ejected provided side by side in a circumferential direction at the front end side of the collet body 4. The collet body 4 is mounted on the torch body 5 by screwing the rear end portion of the collect body 4 into the torch body 5. The collet body 4 is detachably mounted on the torch body 5.

The torch body 5 include a metallic mounting body 10 formed using metallic material having lower electric conductivity and lower heat conductivity than those of the collet 3 and the collet body 4, for example, steel such as mild steel and stainless steel, or brass. The metallic mounting body 10 is covered with an insulating resin.

The metallic mounting body 10 works as a power feeding portion which supplies electric power to the non-consumable electrode 2 via the collet body 4 and collet 3. Specifically, the metallic mounting body 10 is in contact with the collet body 4. The rear end face of the enlarged diameter portion 3e of the collet 3 is in contact with a front end face of a male screw 51a of the mounting bracket 51A which is screwed into the metallic mounting body 10. Thereby, the metallic mounting body 10 works as the power feeding portion which supplies electric power to the non-consumable electrode 2 through the collet body 4 and the collet 3. In addition, a passage which supplies the shield gas to the collet body 4 is formed on the inside of the metallic mounting body 10.

The collet body 4 is mounted on one end side (front end side) of a portion 10a which is formed so as to be roughly cylindrical (below, abbreviated to "cylindrical portion 10a") of the metallic mounting body 10 by screwing. In addition, the torch cap 8 is mounted on the other end side of the cylindrical portion 10a by screwing. The collet body 4 and the torch cap 8 are detachably mounted on the cylindrical portion 10a. The metallic mounting body 10 includes a connection portion 10c at the front end of a portion 10b which downwardly extends so as to be roughly tubular shape from the middle of a cylindrical portion 10a (below abbreviated to "extension portion 10b"). One end of the welding cable C can be connected to the connection portion 10c. The other end of the welding cable C is connected with a welding power source apparatus (not shown in figures). It is possible to supply electric power and the shield gas from the welding power source apparatus to the welding torch 1A. Moreover, examples of the shield gas include inert gas, such as argon, and helium.

The torch nozzle 6 is for rectifying the shield gas ejected from the ejection holes 4b of the collet body 4, as well as preventing contamination of sputtering particles during welding. The torch nozzle 6 has a roughly cylindrically-formed nozzle structure using a material having excellent heat resistance, such as ceramic, and the radius of the front end thereof is gradually reduced. The torch nozzle 6 is screwed to the periphery of the collet body 4. Thereby, the torch nozzle 6 is detachably mounted on the collet body 4.

The mounting jig 50A includes a mounting bracket 51A formed using steel such as mild steel and stainless steel or brass. The mounting bracket 51A is covered with an insulating resin. The mounting bracket 51A includes a male screw 51a on one end side (front end side) which can be screwed into a female screw 10d of the metallic mounting body 10. The mounting jig 50A is detachably mounted on the torch body 5 by screwing the male screw 51a of the mounting bracket 51A into the female screw 10d of the metallic mounting body 10.

In addition, the mounting bracket 51A include a female screw 51b on the side (rear end side) opposite to the side where the male screw 51a is formed. The female screw 51b is commonalized with the female screw 10d of the metallic mounting body 10. The mounting bracket 51A includes a through hole 51c in which the non-consumable electrode 2 is penetrated in the longitudinal direction at the center portion.

By screwing the male screw 51a of the mounting bracket 51A into the female screw 10d of the metallic mounting body 10, the mounting jig 50A pressurizes the collet 3 toward the front end side while the front end of the male screw 51a is in contact with the rear end (the enlarged diameter portion 3e) of the collet 3. At this time, the front end face (a tapered portion 3d) of the collet 3 which is inserted into the through hole 4a of the collet body 4 is pressurized to the front side face of the through hole 4. As a result, a front end portion 3c of the collet 3 elastically deforms so as to reduce the diameter. Thereby, the front end portion 3c of the collet 3 holds the non-consumable electrode 2, and the non-consumable electrode 2 is fixed in the collet 3. On the other hand, it is possible to adjust a position of the non-consumable electrode 2 in the longitudinal direction or remove and change the non-consumable electrode 2 by loosening the screw of the mounting jig 50A.

The wire-aiming guide 60 includes a feeding head 61 from the front end side of which the welding wire W is delivered while guiding the welding wire W, and a liner 62 which feeds the welding wire W toward the front end side of the feeding head 61. The feeding head 61 of the wire-aiming guide 60 is detachably mounted on the periphery of the mounting jib 50A with a support tool 63.

The feeding head 61 includes a linear portion 61a which extends in the longitudinal direction and a curved portion 61b of which the front end side curves toward the front end side of the non-consumable electrode 2. The liner 62 is connected with a wire feeder (not shown in figures). The wire feeder automatically feeds the welding wire W to the welding torch 1A.

Figure 4A:
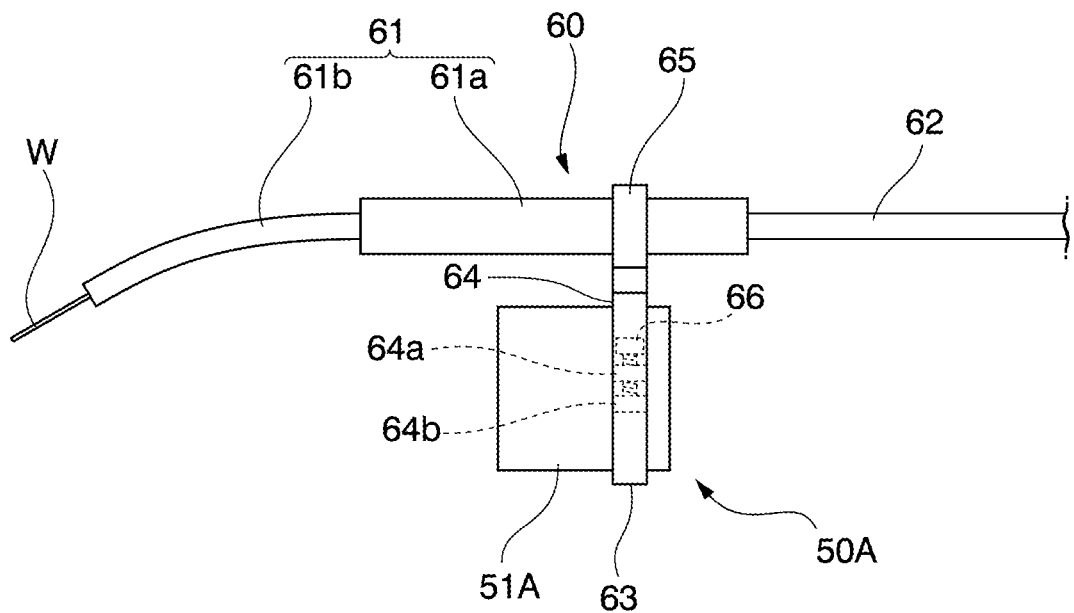
FIG. 4A is a side view illustrating a wire-aiming guide mounted on the mounting jig with a support tool.
Figure 4B:
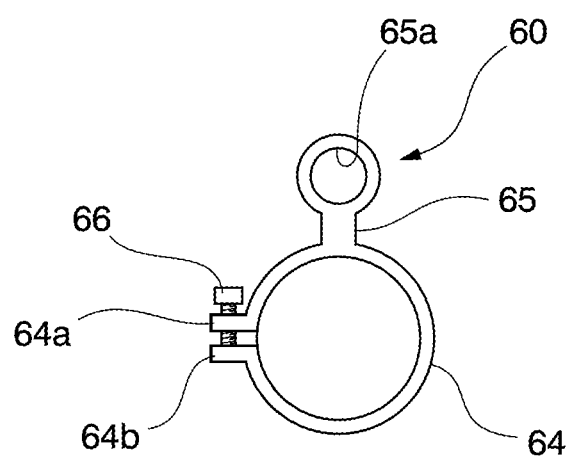
FIG. 4B is a front view illustrating a wire-aiming guide.

As shown in FIGS. 4A and 4B, the support tool 63 includes a ring portion 64 which holds the periphery of the mounting jig 50A and an arm portion 65 which outwardly extends from the periphery of the ring portion 64. FIG. 4A is a side view illustrating a wire-aiming guide 60 which is mounted on the mounting jig 50A with a support tool 63. FIG. 4B is a front view illustrating a wire-aiming guide 60.

The ring portion 64 has a shape that a ring has an open part and includes a pair of flange portions 64a and 64b at both ends of the open part. A pair of the flange portions 64a and 64b have a screw hole (not shown in figures). The support tool 63 can be fixed on the periphery of the mounting jig 50A by fastening a screw 66 in the screw hole and elastically deforming in the shrunk radial direction. On the other hand, the support tool 63 can also detach from the periphery of the mounting jig 50A by releasing the fasten screw 66.

The arm portion 65 holds the periphery of the feeding head 61 such that the linear portion 61a of the feeding head 61 is in parallel to the non-consumable electrode 2 by inserting the feeding head 61 into a hole 65a formed at the tip side of the arm portion 65. Moreover, the support tool 63 does not always have the structure explained above. As long as the support tool 63 has a structure which enable to mount on the periphery of the mounting jig 60A, the support tool 63 has any structures other than the structure explained above.

As shown in FIGS. 1, 2, and 3, the torch cap 8 closes the rear end side of the torch body 5. The torch cap 8 includes a male screw 8a which can screw into the female screw 10d of the metallic mounting body 10. The torch cap 8 is detachably mounted on the mounting jig 50A by screwing the male screw 8a into the female screw 51b of the mounting bracket 51A. In addition, the torch cap 8 has a roughly cap shape so as to store the rear end side of the non-consumable electrode 2 thereinside.

The handle 9 is a portion where a user grips. The handle 9 has a roughly pipe shape, and is mounted on the extension portion 10b of the torch body 5. The welding cable C can be connected with the connection portion 10c by passing through the inside of the handle 9.

When welding is performed using the welding torch 1A explained above, the arc is generated between the work piece and the non-consumable electrode 2, the molten pool is formed by the heat of the arc. During welding, atmosphere (air) is blocked by ejecting the shield gas from the torch nozzle 6 surrounding the non-consumable electrode 2. In addition, the welding is performed by automatically feeding the welding wire W toward the molten pool of the work piece and melting the welding wire W in the arc. In this case, since the welding wire W is automatically fed, the welding torch 1A can be operated with one hand, and welding can be performed safely and easily.

By the way, the welding torch 1A according to this embodiment has a structure in which the rear gasket 107 provided with the generic TIG welding torch 100 is detached, and the mounting jig 50A for mounting the wire-aiming guide 60 is mounted between the torch body 5 and the torch cap 8. In other words, the male screw 51a of the mounting bracket 51A is commonalized with the male screw 8a of the torch cap 8. Thereby, the mounting jig 50A can be mounted on the torch body 5 by screwing the male screw 51a of the metallic mounting body 10 into the female screw 10d of the torch body 5. In addition, the torch cap 8 can be mounted on the mounting jig 50A by screwing the male screw 8a of the torch cap 8 into the female screw 51b of the mounting bracket 51A.

In this case, since the mounting jig 50A is mounted on the rear end side of the torch body 5, influence by heat of the arc can be prevented than the conventional case in which the wire-aiming guide is mounted on the periphery of the torch nozzle 105 with the mounting jig.

In addition, since the mounting jig 50A is mounted on the torch body 5 by screwing, it is possible to mount the wire-aiming guide 60 stabler than the conventional manner. Thereby, it is possible to prevent the problem that the wire-aiming guide 60 moves during the operation, and the feeding position of the welding wire W is not determined.

Furthermore, the female screw 10d of the torch body 5 has a fixed size in the TIG welding torches made by different manufacturers. Therefore, it is possible to share the mounting jig 50A in the TIG welding torches made by different manufactures.

As explained above, it is possible to stably mount the wire-aiming guide 60 using the mounting jig 50A in the welding torch 1A according to this embodiment. In addition, the welding torch 1A includes a structure for mounting the wire-aiming guide 60 having high versatility.

Second Embodiment

Figure 5:
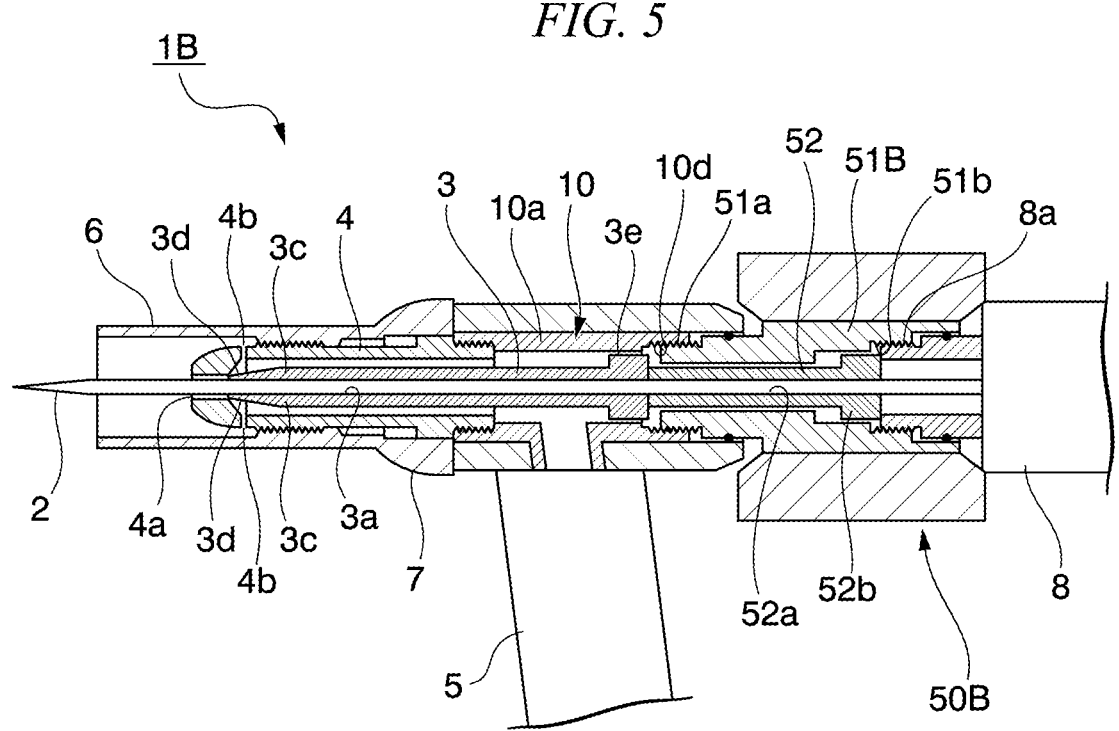
FIG. 5 is a built-up cross section illustrating a mounting mechanism of the welding torch according to the second embodiment of the present invention.
Figure 6:
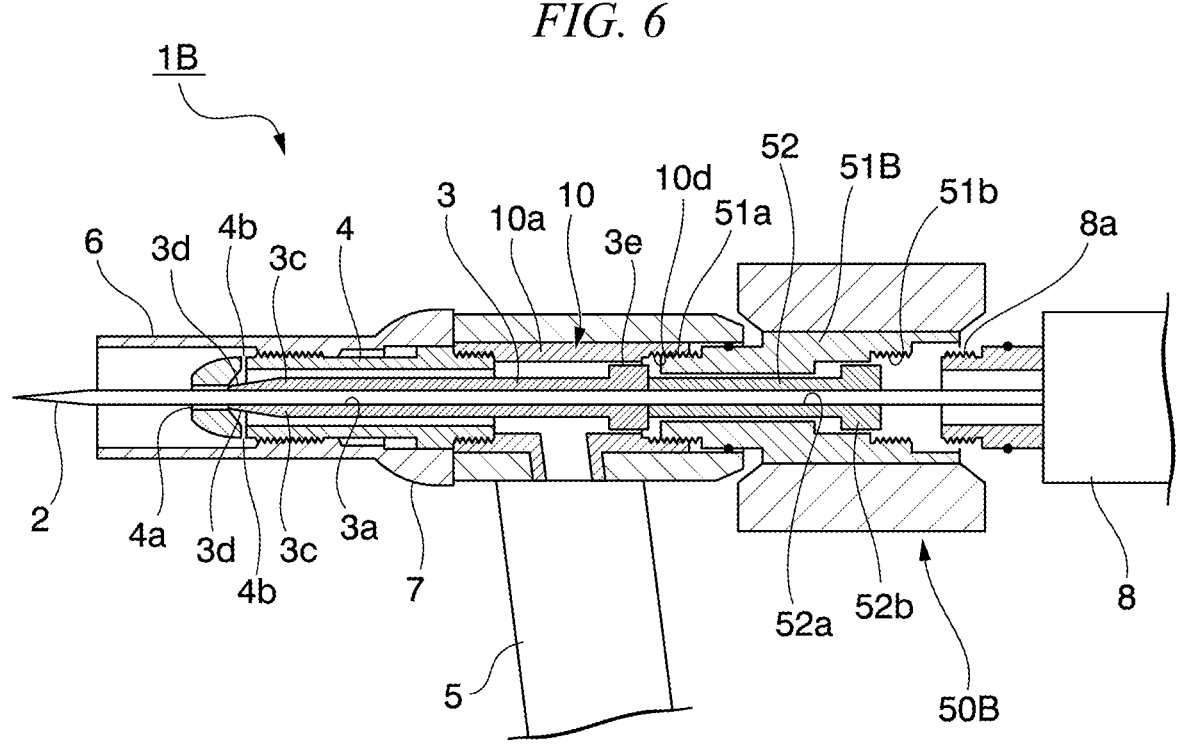
FIG. 6 is an exploded cross section illustrating a mounting mechanism of the mounting jig mounted on the welding torch according to the second embodiment of the present invention.

Next, as a second embodiment of the present invention, a welding torch 1B and a mounting jig 50B shown in FIGS. 5 and 6 are explained. Moreover, FIG. 5 is a built-up cross section illustrating a mounting mechanism of the mounting jig 50B provided with the welding torch 1B. FIG. 6 is an exploded cross section illustrating a mounting mechanism of the mounting jig 50B provided with the welding torch 1B.

As shown in FIGS. 5 and 6, the welding torch 1B has basically the same structure as that of the welding torch 1A except to include the mounting jig 50 B instead of the mounting jig 50A. In other words, the welding torch 1B has a structure in which the wire-aiming guide 60 is mounted on the generic TIG welding torch 100 using the mounting jig 50B.

Therefore, explanation of the same components of the welding torch 1B as those of the welding torch 1A is omitted by using the same reference numbers. Moreover, the wire-aiming guide 60 is omitted in FIGS. 5 and 6.

For example, the mounting jig 50B include a mounting bracket 51B formed using steel such as mild steel and stainless steel or brass. The mounting bracket 51B is covered with an insulating resin. The mounting bracket 51B includes a male screw 51a on one end side (front end side) which can be screwed into a female screw 10d of the metallic mounting body 10. The mounting jig 50B is detachably mounted on the torch body 5 by screwing the male screw 51a of the mounting bracket 51B into the female screw 10d of the metallic mounting body 10.

In addition, the mounting bracket 51B include a female screw 51b on the side (rear end side) opposite to the side where the male screw 51a is formed. The female screw 51b is commonalized with the female screw 10d of the metallic mounting body 10. An extension collet 52 is inside of the mounting bracket 51B.

The extension collet 52 is a roughly cylindrical member formed using metallic material having excellent electric conductivity and heat conductivity, for example, copper or a copper alloy. The extension collet 52 is slidably held inside of the mounting bracket 51B in the longitudinal direction. In addition, the extension collet 52 has a through hole 52a, and slidably holds the non-consumable electrode 2 inserted into the through hole 52a in the longitudinal direction. In addition, the extension collet 52 has an enlarged diameter portion 52b, which has a larger diameter than that of a portion other than the enlarged diameter portion 52b, at the rear end. The enlarged diameter portion 52b can be in contact with a front end face of the male screw 8a of the torch cap 8.

By screwing the male screw 51a of the mounting bracket 51B into the female screw 10d of the metallic mounting body 10, and screwing the male screw 8a of the torch cap 8 into the female screw 51b of the mounting bracket 51B, the mounting jig 50B pressurizes the collet 3 toward the front end side while the front end of the extension collet 52 is in contact with the rear end of the collet 3. At this time, the front end face (a tapered portion 3d) of the collet 3 which is inserted into the through hole 4a of the collet body 4 is pressurized to the front side face of the through hole 4. As a result, a front end portion 3c of the collet 3 elastically deforms so as to reduce the diameter. Thereby, the front end portion 3c of the collet 3 holds the non-consumable electrode 2, and the non-consumable electrode 2 is fixed in the collet 3. On the other hand, it is possible to adjust a position of the non-consumable electrode 2 in the longitudinal direction or remove and change the non-consumable electrode 2 by loosening the screw of the torch cap 8.

In the second embodiment, since the mounting bracket 51B includes the extension collet 52, the effects of the present invention can be obtained when the collet 3 is short. Therefore, it is possible to use a cheap commercially available collet 3 in the second embodiment.

Figure 15:
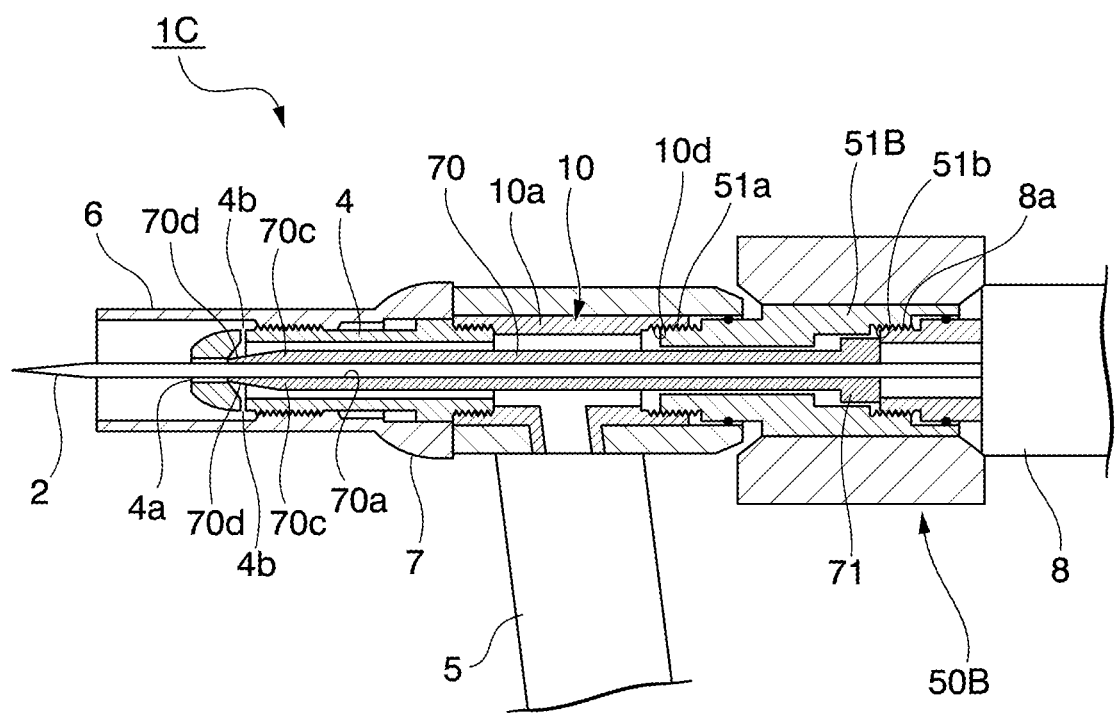
FIG. 15 is a built-up cross section illustrating another embodiment of a mounting mechanism of the welding torch according to the second embodiment of the present invention.

Moreover, it is possible to use a collet 70 in which the extension collet 52 and the collet 3 are integrated as shown in FIG. 15. That is, the collet 70 can be stored inside of the mounting bracket 51B.

FIG. 15 is a built-up cross section illustrating a mounting mechanism of the mounting jig 50B provided with the welding torch 1C, in which the collet 70 is stored. As shown in FIG. 15, the welding torch 1C basically has the same structure as that of the welding torch 1B except to include the collet 70. In other words, the welding torch 1C has a structure in which the wire-aiming guide 60 is mounted on the generic TIG welding torch 100 using the mounting jig 50B according to this embodiment. Therefore, explanation of the same components of the welding torch 1C as those of the welding torch 1B is omitted by using the same reference numbers. Moreover, the wire-aiming guide 60 is omitted in FIG. 15.

The collet 70 has a structure in which the extension collet 52 and the collet 3 are integrated. The collet 70 has a through hole 70a which is penetrated in the longitudinal direction. The collet 70 slidably supports the non-consumable electrode 2 inserted into the through hole 70a in the longitudinal direction. In addition, the collet 70 includes a tapered portion 70d the radius of which is gradually reduced at a front end 70c. Furthermore, the collet 70 also includes an enlarged diameter portion 71 which has a larger diameter than that of a portion other than the enlarged diameter portion 71. The enlarged diameter portion 70 can be in contact with the front end face of the male screw 8a of the torch cap 8.

When welding is performed using the welding torch 1B or 1C explained above, the arc is generated between the work piece and the non-consumable electrode 2, the molten pool is formed by the heat of the arc. During welding, atmosphere (air) is blocked by ejecting the shield gas from the torch nozzle 6 surrounding the non-consumable electrode 2. In addition, during welding, the welding wire W is automatically supplied toward the welding pool of the work piece and welding is performed by melting the welding wire W in the arc. In this case, since the welding wire W is automatically fed, the welding torch 1A can be operated with one hand, and welding can be performed safely and easily.

By the way, the welding torch 1B, 1C according to this embodiment has a structure in which the rear gasket 107 provided with the generic TIG welding torch 100 is detached, and the mounting jig 50B for mounting the wire-aiming guide 60 is mounted between the torch body 5 and the torch cap 8. In other words, the male screw 51a of the mounting bracket 51B is communalized with the male screw 8a of the torch cap 8 in the mounting jig 50B. Thereby, the mounting jig 50B can be mounted on the torch body 5 by screwing the male screw 51a of the mounting bracket 51B into the female screw 10d of the torch body 5. In addition, the torch cap 8 can be mounted on the mounting jig 50B by screwing the male screw 8a of the torch cap 8 into the female screw 51b of the mounting bracket 51B.

In this case, since the mounting jig 50B is mounted on the rear end side of the torch body 5, influence by heat of the arc can be prevented than the conventional case in which the wire-aiming guide is mounted on the periphery of the torch nozzle 105 with the mounting jig.

In addition, since the mounting jig 50B is mounted on the torch body 5 by screwing, it is possible to mount the wire-aiming guide 60 stabler than the conventional manner. Thereby it is possible to prevent the problem that the wire-aiming guide 60 moves during the operation, and the feeding position of the welding wire W is not determined.

Furthermore, the female screw 10d of the torch body 5 has a fixed size in the TIG welding torches made by different manufacturers. Therefore, it is possible to share the mounting jig 50B in the TIG welding torches made by different manufactures.

As explained above, it is possible to stably mount the wire-aiming guide 60 using the mounting jig 50B in the welding torch 1B, 1C according to this embodiment. In addition, the welding torch 1B, 1C includes a structure for mounting the wire-aiming guide 60 having high versatility.

Moreover, the present invention is not limited to the first and second embodiments above, and the constitution can be changed as far as the change of the constitution is within the scope of the present invention.

For example, the feeding position of the welding wire W using the wire-aiming guide 60 can be freely changed by changing the mounting position of the support tool 63 relative to the mounting jig 50A, 50B in the welding torch 1A, 1B, and 1C.

Figure 7:
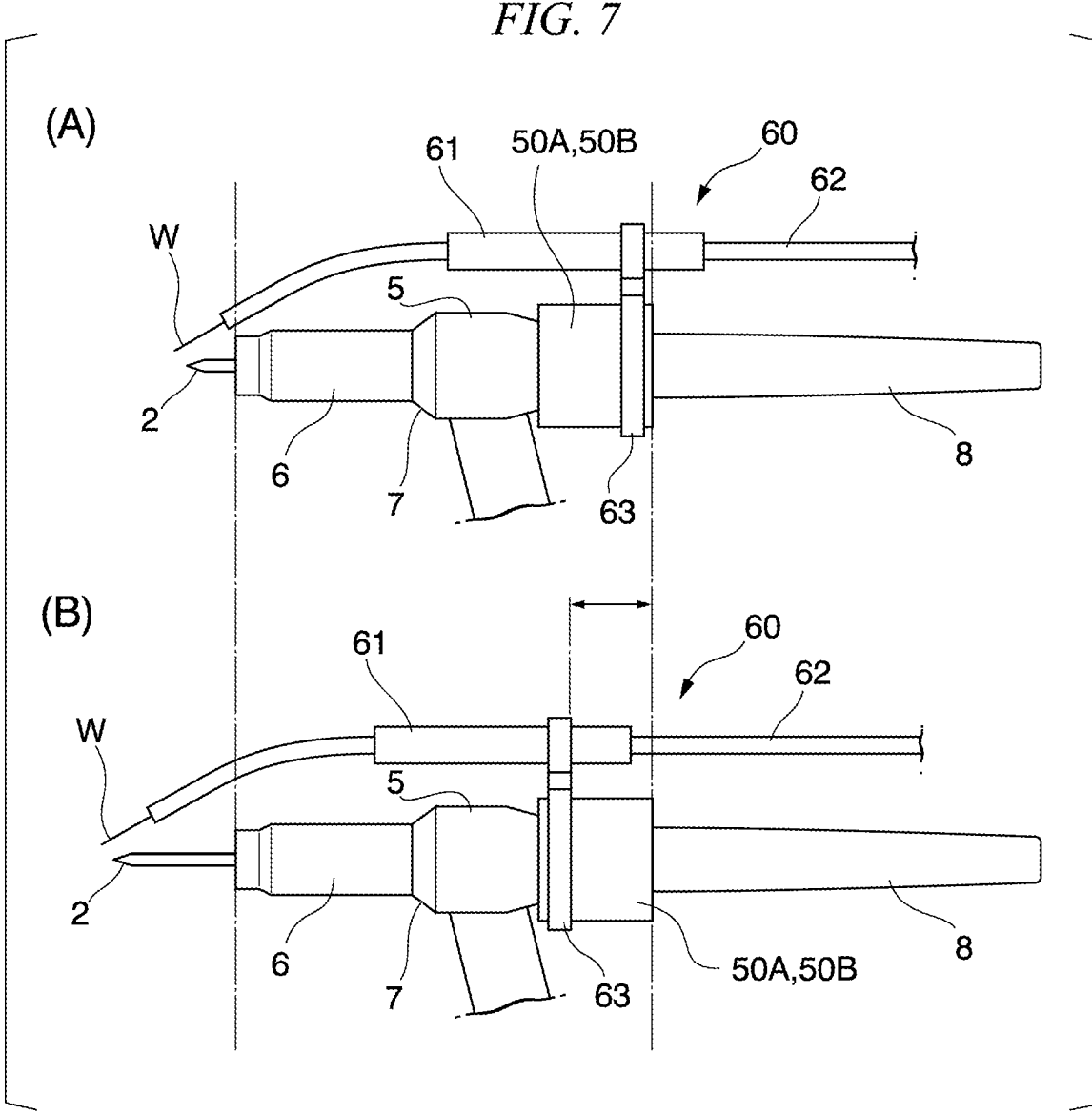
FIG. 7 illustrates a state of the wire-aiming guide where the wire-aiming guide slides in a front-back direction, (A) is a side view illustrating the wire-aiming guide in a state of sliding backwardly and (B) is a side view illustrating the wire-aiming guide in a state of sliding forwardly.

Specifically, the distance between the tip end of the welding wire W and the molten pool can be freely adjusted by sliding the support tool 63 for supporting the feeding head 61 forward and backward relative to the mounting jig 50A, 50B (that is, by sliding the support tool 63 parallel to the mounting jig 50A, 50B) as shown in FIGS. 7(A) and (B). Moreover, FIG. 7 (A) is a side view illustrating the state where the support tool 63 is slid backwardly relative to the mounting jig 50A, 50B. FIG. 7 (B) is a side view illustrating the state where the support tool 63 is slid forwardly relative to the mounting jig 50A, 50B.

Figure 8:
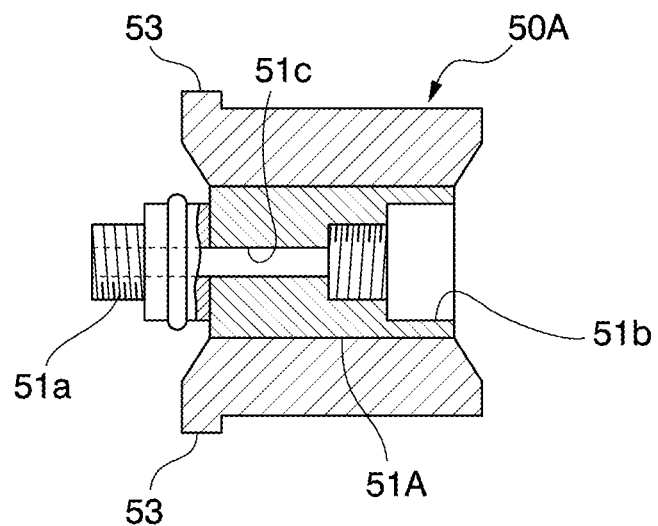
FIG. 8 is side view illustrating the mounting jig on periphery of which a stopper is mounted.

In addition, the mounting jig 50A can includes a stopper 53 on the periphery as shown in FIG. 8. The stopper 53 is a portion protruding outwardly at the front end of the mounting jig 50A. When the stopper 53 is provided with the mounting jig 50A and the support tool 63 is slid forwardly, the support tool 63 is in contact with the stopper 53, and drop off of the support tool 63 from the front end side of the mounting jig 50A can be prevented. Moreover, FIG. 8 shows the mounting jig 50A having the stopper 53. However, the stopper 53 can also be formed in the mounting jig 50B.

Figure 9:
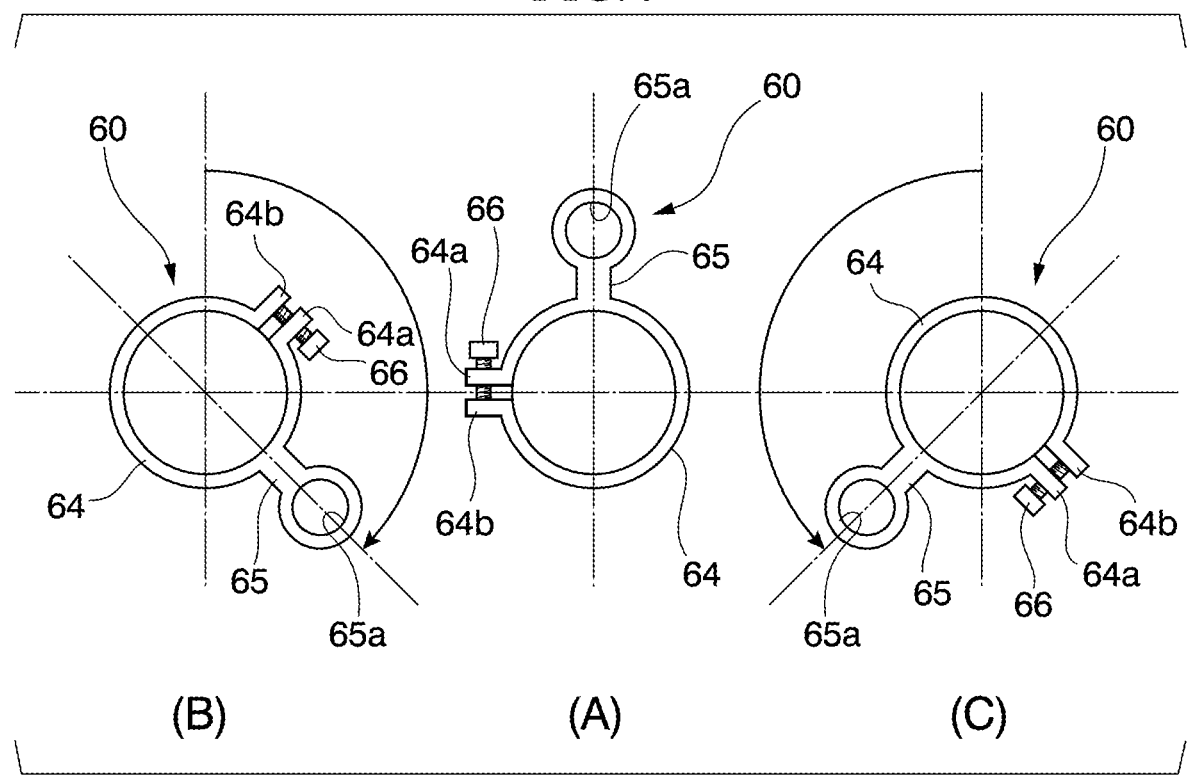
FIG. 9 illustrates a state where a periaxial position of the support tool relative to the mounting jig is changed, (A) is a front view illustrating the support tool in a state where a feeding head is upwardly positioned, (B) is a front view illustrating the support tool in a state where the feeding head is rotated in one direction from the state shown in FIGS. 9(A), and (C) is a front view illustrating the support tool in a state where the feeding head is rotated in the other direction from the state shown in FIG. 9(A).

In addition, the direction of the welding wire W supplied from the front end of the feeding head 61 can be freely changed by changing the position of the support tool 63 relative to the mounting jig 50A, 50B in the periaxial direction, as shown in FIGS. 9(A), (B), and (C). Moreover, FIG. 9 (A) is a front view illustrating the state where the feeding head 61 is positioned upwardly. FIG. 9 (B) is a front view illustrating the state where the feeding head 61 is rotated in one direction from the states shown in FIG. 9(A). FIG. 9 (A) is a front view illustrating the state where the feeding head 61 is rotated in the other direction from the states shown in FIG. 9(A).

Figure 10A:
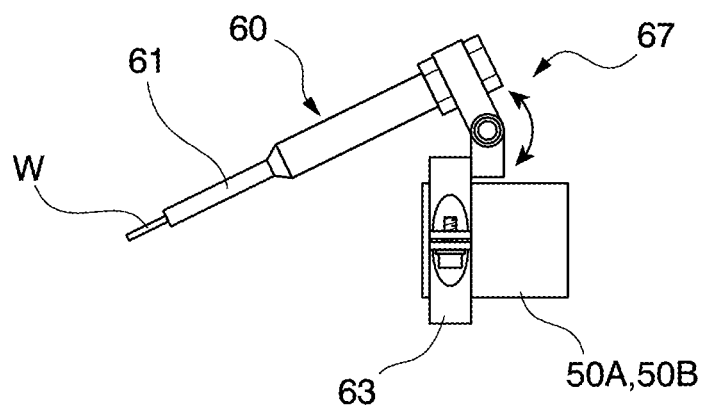
FIG. 10A is a side view illustrating another embodiment of the wire-aiming guide which has a rotation mechanism.

In addition, the wire-aiming guide 60 can include a rotation mechanism 67 for supporting so as to freely tilt the feeding head 61, as shown in FIG. 10A. In this case, the tilting angle of the feeding head 61 can be freely adjusted.

Figure 10B:
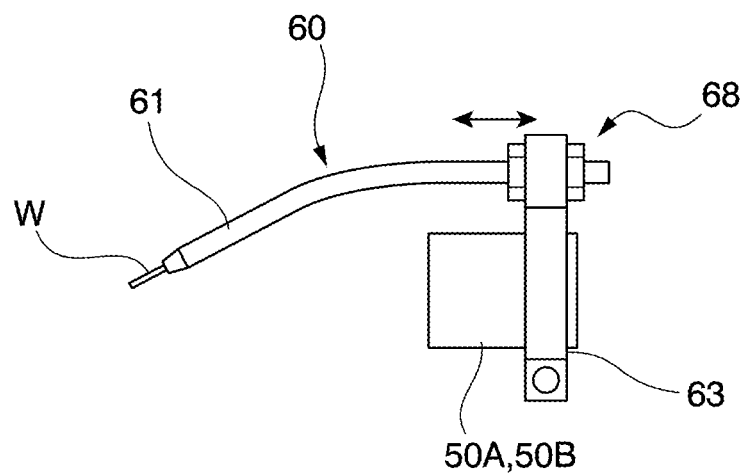
FIG. 10B is a side view illustrating further another embodiment of the wire-aiming guide which has a slide mechanism.

On the other hand, the wire-aiming guide 60 can include a slide mechanism 68 for supporting so as to freely slide the feeding head 61 in front-back direction as shown in FIG. 10B. In this case, the distance between the tip end of the welding wire W and the molten pool can be freely adjusted.

Figure 10C:
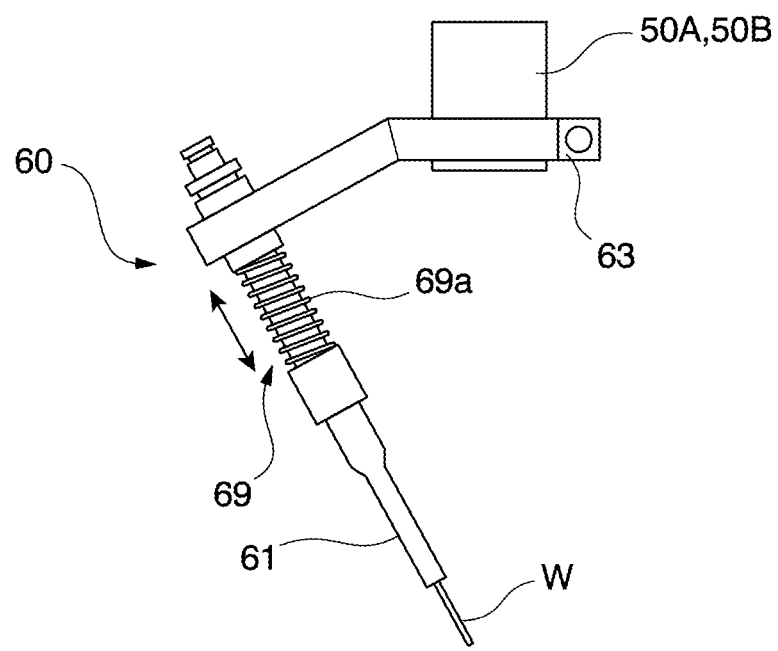
FIG. 10C is a side view illustrating further another embodiment of the wire-aiming guide which has a damper mechanism.

Furthermore, the wire-aiming guide 60 can includes a damper mechanism 69 between the feeding head 61 and the support tool 63 as shown in FIG. 10C. The damper mechanism 69 supports the feeding head 61 so as to slide in the front-back direction in a state where the feeding head 61 is energized forward by a coil spring 69a. Thereby, when the tip end of the welding wire W is pressurized to a weldment, it is possible to suppress the deflection during welding while absorbing the shock.

Figure 11:
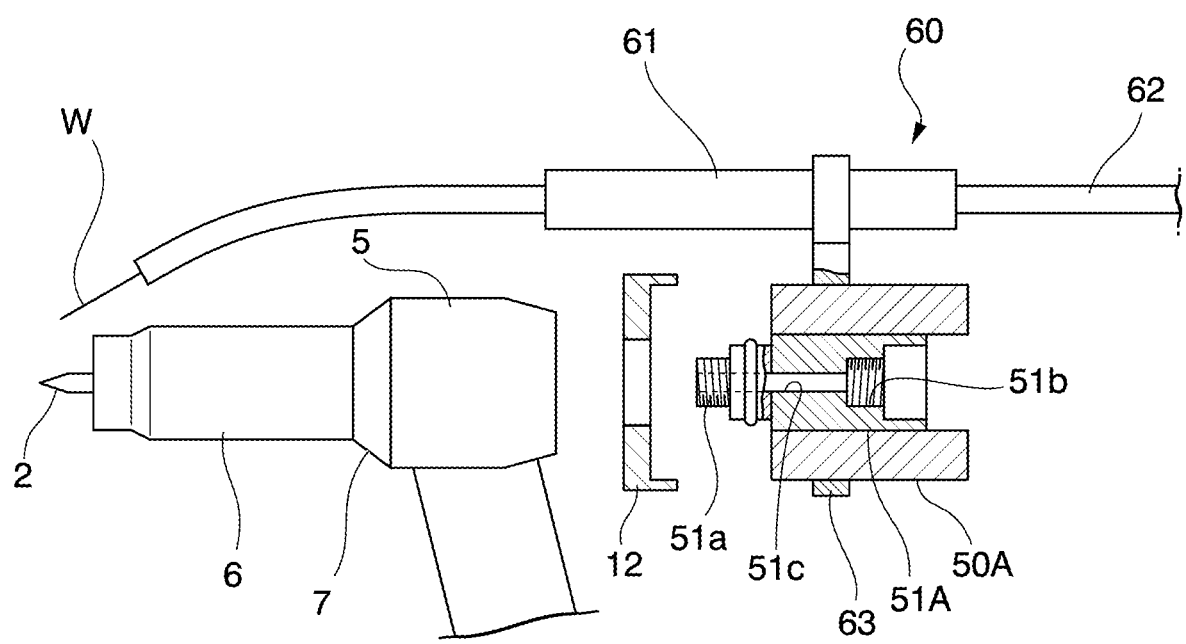
FIG. 11 is a cross section illustrating one example of a rear side gasket.
Figure 12:
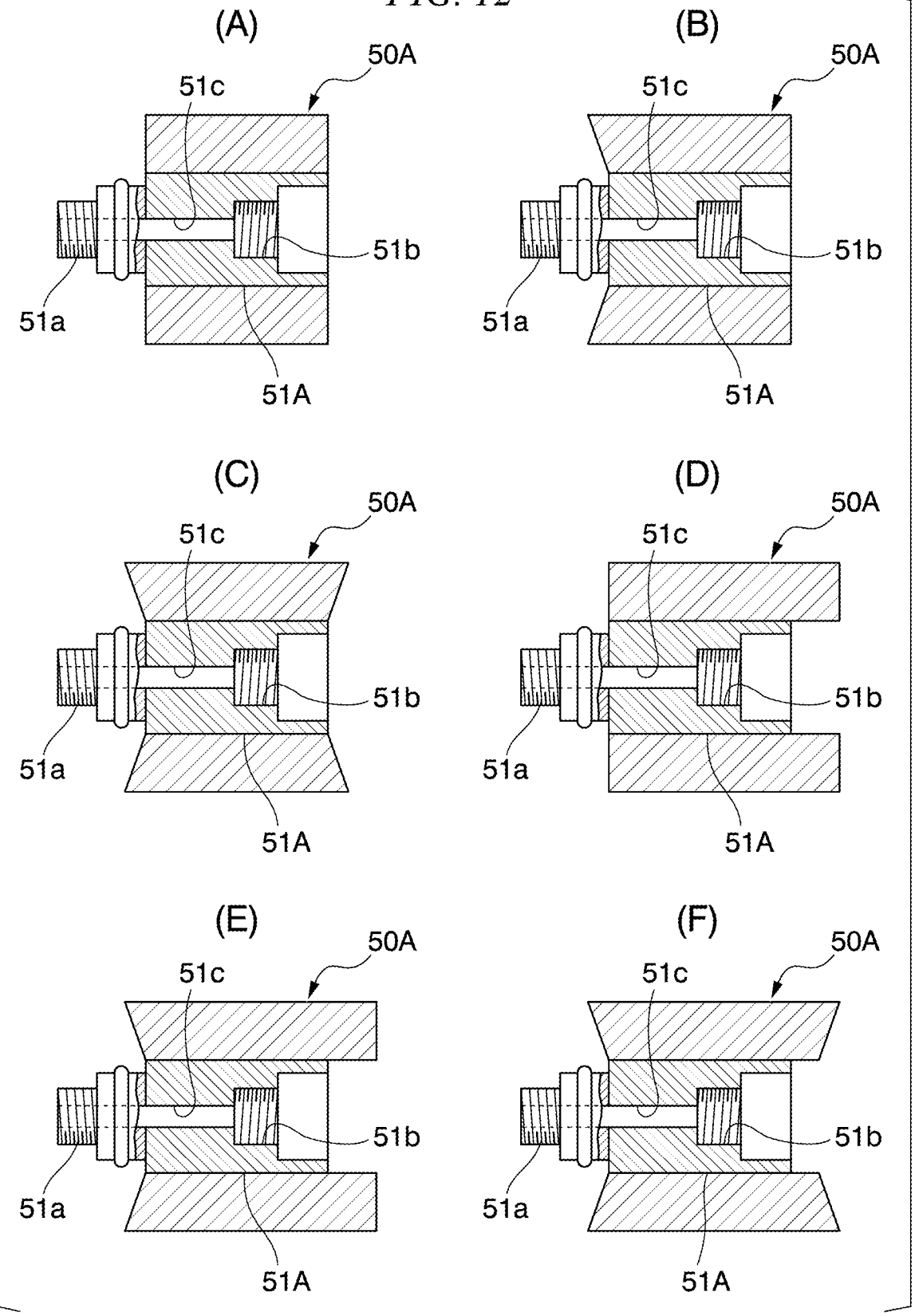
FIG. 12 is a cross section illustrating another embodiment of the mounting jig.

Furthermore, the welding torch 1A, 1B, and 1C has a structure in which the rear gasket 107 of the generic TIG welding torch 100 is removed, and the mounting jig 50A, 50B is arranged between the torch body 5 and the torch cap 8. However, it is not always required to remove the rear gasket 107. For example, a rear gasket 12 having a shape conformed to the shape of the front end side of the mounting jig 50A can be arranged between the torch body 5 and the mounting jig 50A instead of the rear gasket 107 as shown in FIG. 11. Moreover, FIG. 11 illustrate the state using the mounting jig 50A. However, the mounting jig 50B can also use the rear gasket 12. It is possible to prevent the leakage of the shield gas by arranging the rear gasket 12 between the torch body 5 and the mounting jig 50A (the mounting jig 50B).

On the other hand, the mounting jig 50A, 50B can be mounted while providing the rear gasket 107 in the welding 1A, 1B, and 1C. In this case, the shape of the front end side of the mounting jig 50A, 50B may be changed so as to conform to the shape of the rear gasket 107. For example, the shape at the front end side of the mounting jig 50A can be freely changed by changing the shape of the insulating resin covering the periphery of the mounting bracket 51A as shown in FIG. 12(A) to (F). Moreover, FIG. 12(A) to (F) shows the variations of the mounting jig 50A. However, the shape at the front end side of the mounting jig 50B can also be changed by changing the shape of the insulating resin covering the periphery of the mounting bracket 51B.

Figure 13:
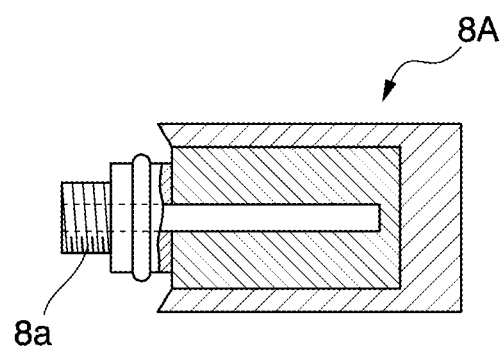
FIG. 13 is a cross section illustrating another embodiment of the torch cap.
Figure 14A:
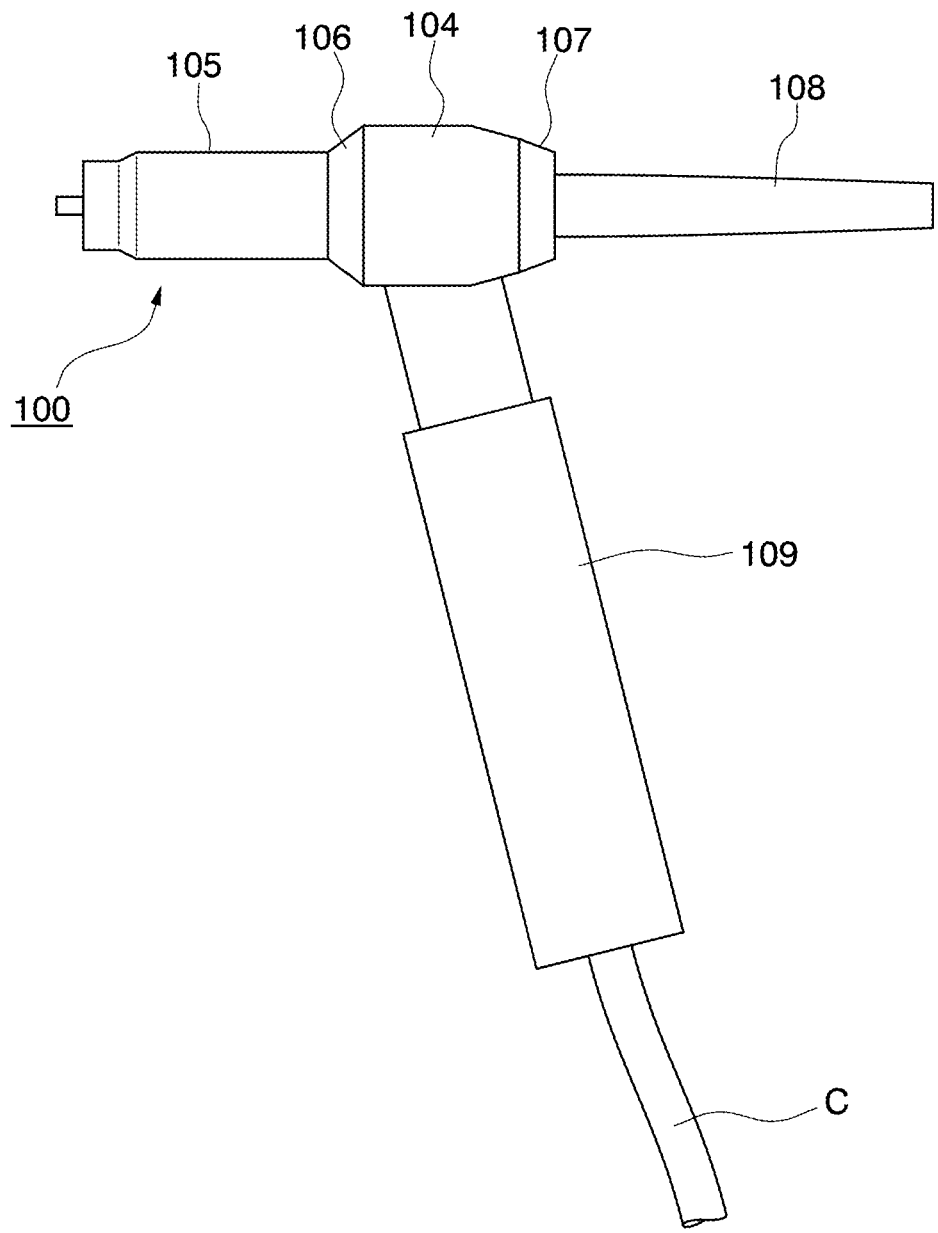
FIG. 14A is a side view illustrating the conventional TIG welding torch.
Figure 14B:
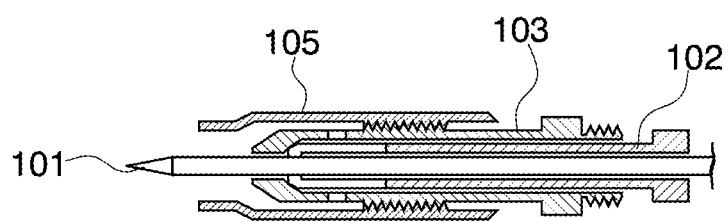
FIG. 14B is a cross section of a main section of the conventional TIG welding torch.

In addition, the torch cap 8 does not always have a long cap shape so as to store the rear end side of the non-consumable electrode 2. The torch cap 8A having a short cap shape as shown in FIG. 13 can also be used.

In addition, the welding torch 1A, 1B, and 1C has a single nozzle structure in which the shield gas is ejected from the torch nozzle 6. However, the welding torch of the present invention is limited to have such a single nozzle structure. For example, the welding torch according to the present invention can have a double nozzle structure in which oxidized gas is ejected from an outer torch nozzle (outer nozzle) while ejecting inert gas from an inner torch nozzle (inner nozzle).

Furthermore, the welding torch 1A, 1B, and 1C employs an air cooling type. However, a liquid cooling type can also be employed. When the liquid cooling type is employed, the welding torch can be forcibly cooled by circulating a coolant flowing in the welding torch by a cooling system connected to the welding electric power source.

DESCRIPTION OF REFERENCE NUMBER 1A, 1B, 1C welding torch
2 non-consumable electrode
3 collet
3a through hole
3b slit
3c front end
3d tapered portion
3e enlarged diameter portion
4 collet body
4a through hole
4b ejection hole
5 torch body
6 torch nozzle
7 front gasket
8, 8A torch cap
8a male screw
9 handle
10 metallic mounting body
10a cylindrical portion
10b extension portion
10c connection portion
10d female screw
12 rear gasket
50A, 50B mounting jig
51A, 51B mounting bracket
51a male screw
51b female screw
51c through hole
52 extension collet
52a through hole
52b enlarged diameter portion
53 stopper
60 wire-aiming guide
61 feeding head
61a linear portion
61b curved portion
62 liner
63 support tool
64 ring portion
64a, 64b flange portion
65 arm portion
65a hole
66 screw
67 tilt mechanism
68 slide mechanism
69 damper mechanism
69a coil spring
70 collet
70a through hole
70c front end
70d tapered portion
71 enlarged diameter portion
C welding cable
W welding wire

The invention claimed is:

1. A welding torch comprising:
   a non-consumable electrode which generates an arc between a work piece and the non-consumable electrode;
   a collet which supports the non-consumable electrode in a state where the non-consumable electrode is inserted;
   a collet body on the inside of which the collet is held in a state of projecting the non-consumable electrode from a front end of the collet body;
   a torch body on which the collet body is mounted, and which comprises an electric supplying part for supplying electric power to the non-consumable electrode through the collet body and the collet and a passage for supplying a shield gas;
   a torch nozzle which is mounted on the collet body in a state of surrounding the non-consumable electrode and emits the shield gas toward a molten pool of the work piece which is generated by the arc;
   a wire-aiming guide which feeds a welding wire toward the molten pool of the work piece;
   a mounting jig with which the wire-aiming guide is mounted; and
   a torch cap which has a first male screw which can be screwed into a first female screw of the mounting jig which is formed on a side opposite to where the collet body is mounted and is detachably mounted on the torch body, and adjust a position of the non-consumable electrode in the longitudinal direction by loosening the first female screw;
   wherein the mounting jig comprises a second male screw which can be screwed into a second female screw of a mounting body of the torch body, such that the mounting jig is detachably mounted on the torch body.

2. The welding torch according to claim 1, wherein the mounting jig comprises a through hole in which the non-consumable electrode is penetrated.

3. The welding torch according to claim 2, wherein the mounting jig comprises an extension collet which slidably supports the non-consumable electrode inserted into the through hole in the longitudinal direction;
   in a state where the male screw of the mounting jig is screwed into the female screw of the torch body, and the male screw of the torch cap is screwed into the female screw of the mounting jig, the front end of the extension collet pressurizes the collet toward a front end side of the collet body while the front end of the extension collet is in contact with the rear end of the collet.

4. The welding torch according to claim 1, wherein, in a state where the second male screw of the mounting jig is screwed into the second female screw of the torch body, a front end of the second male screw pressurizes the collet toward a front end side of the collet body while the front end of the second male screw is in contact with a rear end of the collet.

5. The welding torch according to claim 1, wherein the wire-aiming guide is mounted on a periphery of the mounting jig through a support tool.

6. The welding torch according to claim 5, wherein a feeding position of the welding wire is adjusted by changing a mounting position of the support tool relative to the mounting jig.

7. The welding torch according to claim 6, wherein the mounting jig comprises a stopper which regulates a movement of the support tool.

* * * * *